(12) United States Patent
Breslau et al.

(10) Patent No.: US 7,853,827 B2
(45) Date of Patent: Dec. 14, 2010

(54) ISOTROPIC PROCESSOR

(75) Inventors: Franklin C. Breslau, Teaneck, NJ (US); Paul G. Greenstein, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/201,707

(22) Filed: Aug. 29, 2008

(65) Prior Publication Data

US 2010/0058110 A1    Mar. 4, 2010

(51) Int. Cl.
*G06F 11/00* (2006.01)
(52) U.S. Cl. .............. 714/19; 714/15; 714/35
(58) Field of Classification Search ........ 714/15, 714/19, 35
See application file for complete search history.

(56) References Cited

U.S. PATENT DOCUMENTS

| | | |
|---|---|---|
| 5,172,378 A | 12/1992 | Sugioka et al. |
| 6,038,643 A | 3/2000 | Tremblay et al. |
| 6,125,439 A | 9/2000 | Tremblay et al. |
| 6,898,696 B1 | 5/2005 | Cheong et al. |
| 6,904,517 B2 | 6/2005 | Nevill et al. |
| 6,968,476 B2 | 11/2005 | Barowski et al. |
| 7,139,877 B2 | 11/2006 | Hooker |
| 2003/0204778 A1* | 10/2003 | Wilding et al. ............. 714/19 |
| 2008/0256519 A1* | 10/2008 | Shen ............................ 717/128 |

FOREIGN PATENT DOCUMENTS

EP    1150203    10/2001

OTHER PUBLICATIONS

Wu, Kun-Lung, et al., "Error Recovery in Shared Memory Multiprocessors Using Private Caches", IEEE Transactions on Parallel and Distributed Systems, pp. 231-240, vol. 1, No. 2, Apr. 1990, IEEE.

* cited by examiner

*Primary Examiner*—Robert Beausoilel
*Assistant Examiner*—Charles Ehne
(74) *Attorney, Agent, or Firm*—Suiter Swantz pc llo

(57) ABSTRACT

The present disclosure is directed toward a method for restoring a computer processor to a previous state. Described is a processor/memory architecture that may store successive instructions/data into a pushdown stack. As instructions are loaded and executed, the loading and executing of new instructions may be suspended. The instruction execution and memory stack then may be restored to a previous processor state in terms of instructions, processor memory state, register values, etc.

1 Claim, 2 Drawing Sheets

ISOTROPIC PROCESSOR

TECHNICAL FIELD

The present disclosure generally relates to the field of computer processors, and more particularly to a method for returning the processor to a previous state upon an error occurring.

BACKGROUND

Modern processors have a difficulty returning to a previous processor state once an error occurs or an incorrect instruction has been executed. If a problem is encountered and a previous state is to be entered before the problem occurred, instructions must be issued to back out of the results of the previously executed instructions. This requires coding within the application, such as the undo function in MS and Lotus applications. Also, it is very difficult to figure out which program should be "undone" when multiple programs are running simultaneously.

Additionally, if the operating system crashes, it may be possible to take a memory dump and data snapshot, but it may be impossible to revert to the previous state of the processor without a reboot. Furthermore, transaction backouts are possible and may be accomplished without journaling or excessive restorations based upon restore points where all values are recorded. However, additional steps may be required to restore the processor using a transaction backout, and in turn slowing the processor speed.

SUMMARY

The present disclosure is directed toward a method for restoring a computer processor to a previous state. Described is a processor/memory architecture that may store successive instructions/data into a pushdown stack. As instructions are loaded and executed, the loading and executing of new instructions may be suspended. The instruction execution and memory stack then may be restored to a previous processor state in terms of instructions, processor memory state, register values, etc.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

The present disclosure is directed toward a method for restoring a computer processor to a previous state. Described is a processor/memory architecture that may store successive instructions/data into a pushdown stack. As instructions are loaded and executed, the instructions may be placed in the pushdown stack. At any point, new instructions loading and executing may be suspended; and the instruction execution and memory stack restored to the processor state to a previous point in terms of instructions, processor memory state, register values, etc.

Figure 1A:
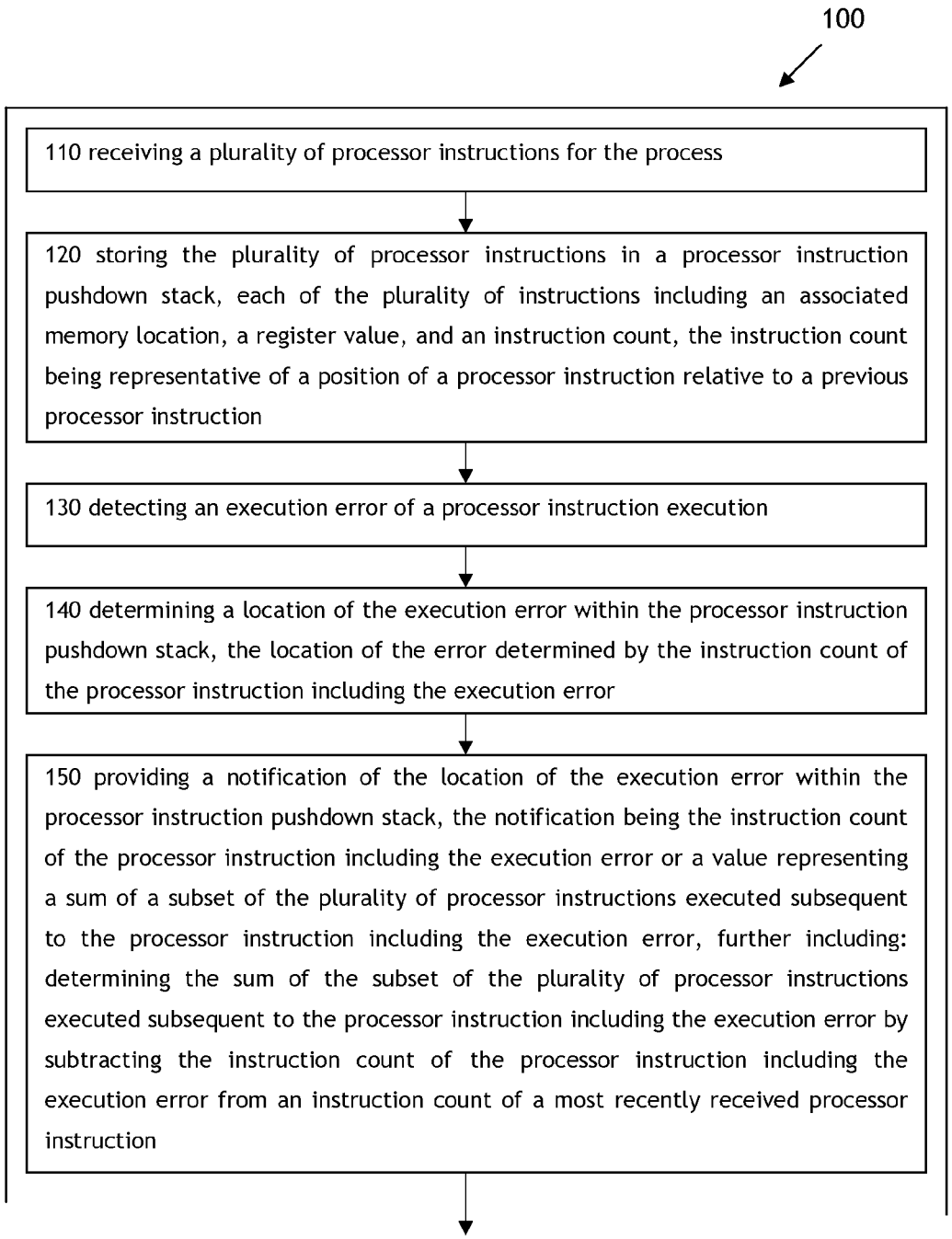
FIG. 1A is a flow diagram for the method to return a computer processor to a previous state.

Referring toe FIG. 1, the method for restoring a computer processor to a previous state is depicted. The method 100 may receive a plurality of processor instructions for a process 110. The method 100 may store the plurality of processor instructions in a processor instruction pushdown stack, each of the plurality of instructions including an associated memory location, a register value, and an instruction count, the instruction count being representative of a position of a processor instruction relative to a previous processor instruction 120. The method 100 may detect an execution error of a processor instruction execution 130. The method 100 may determine a location of the execution error within the processor instruction pushdown stack, the location of the error determined by the instruction count of the processor instruction including the execution error 140. The method 100 may provide a notification of the location of the execution error within the processor instruction pushdown stack, the notification being the instruction count of the processor instruction including the execution error or a value representing a sum of a subset of the plurality of processor instructions executed subsequent to the processor instruction including the execution error 150. This step 150 may further include: determining the sum of the subset of the plurality of processor instructions executed subsequent to the processor instruction including the execution error by subtracting the instruction count of the processor instruction including the execution error from an instruction count of a most recently received processor instruction 150.

Figure 1B:
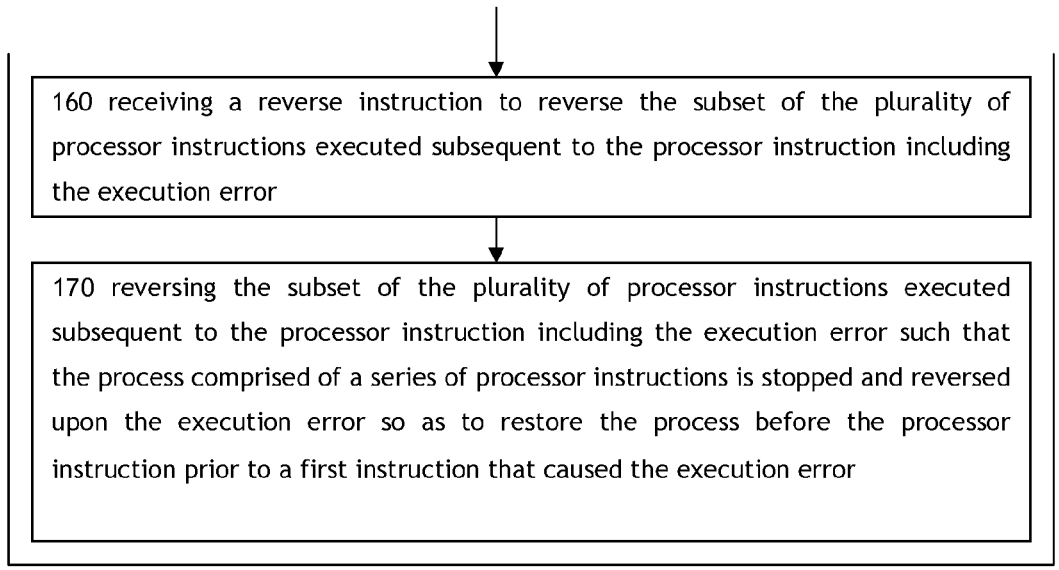
FIG. 1B is a flow diagram for the method to return a computer processor to a previous state.

Referring to FIG. 1B, the method 100 may then receive a reverse instruction to reverse the subset of the plurality of processor instructions executed subsequent to the processor instruction including the execution error 160. Finally, the method 100 may reverse the subset of the plurality of processor instructions executed subsequent to the processor instruction including the execution error such that the process comprised of a series of processor instructions is stopped and reversed upon the execution error so as to restore the process before the processor instruction prior to a first instruction that caused the execution error 170.

A processor may be implemented with an instruction execution stack that is fed via pipelines or memory fetches. A preset number of instructions may be stored with the same number of memory locations, register values, instruction counts, etc. Whenever an instruction is executed, the various values may be stored in different memory areas either internal or external to the processor. Each succeeding instruction execution may cause the stack to be pushed down with the last value in the stack being lost.

Should an execution error occur, the user may be prompted to reverse the current processor state to a previous processor state that was present before the processor instruction that caused the execution error. The processor memory values and registers may be restored to the previous processor memory values and registers. The processor then may execute one instruction at a time, which may be useful in debugging, recreating a previous condition, or backing out a condition.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for restoring a computer processor to a previous state, the method comprising:

receiving a plurality of processor instructions for a process;

storing the plurality of processor instructions in a processor instruction pushdown stack, each of the plurality of instructions including an associated memory location, a register value, and an instruction count, the instruction count being representative of a position of a processor instruction relative to a previous processor instruction;

detecting an execution error of a processor instruction execution;

determining a location of the execution error within the processor instruction pushdown stack, the location of the error determined by the instruction count of the processor instruction including the execution error;

providing a notification of the location of the execution error within the processor instruction pushdown stack, the notification including at least the instruction count of the processor instruction including the execution error or a value representing a sum of a subset of the plurality of processor instructions executed subsequent to the processor instruction including the execution error, further including:

determining the sum of the subset of the plurality of processor instructions executed subsequent to the processor instruction including the execution error by subtracting the instruction count of the processor instruction including the execution error from an instruction count of a most recently received processor instruction;

receiving a reverse instruction to reverse the subset of the plurality of processor instructions executed subsequent to the processor instruction including the execution error; and reversing the subset of the plurality of processor instructions executed subsequent to the processor instruction including the execution error such that the process comprised of a series of processor instructions is stopped and reversed upon the execution error so as to restore the process to before the processor instruction prior to a first instruction that caused the execution error.

* * * * *